United States Patent
Park et al.

(10) Patent No.: US 8,595,726 B2
(45) Date of Patent: Nov. 26, 2013

(54) APPARATUS AND METHOD FOR PARALLEL PROCESSING

(75) Inventors: Jun-Sung Park, Seoul (KR); Hyo-Jung Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1508 days.

(21) Appl. No.: 11/950,840

(22) Filed: Dec. 5, 2007

(65) Prior Publication Data

US 2008/0301677 A1    Dec. 4, 2008

(30) Foreign Application Priority Data

May 30, 2007 (KR) .................. 10-2007-0052823

(51) Int. Cl.
 *G06F 9/46* (2006.01)
(52) U.S. Cl.
 USPC ............ 718/100; 718/101; 718/102; 718/104
(58) Field of Classification Search
 USPC .................. 718/100, 101, 102, 104
 See application file for complete search history.

(56) References Cited

U.S. PATENT DOCUMENTS

| 6,725,448 | B1 * | 4/2004 | Moriya et al. ................ 717/119 |
| 7,444,635 | B2 * | 10/2008 | Lehtinen ...................... 718/104 |
| 7,945,911 | B1 * | 5/2011 | Garthwaite ................... 718/102 |
| 2002/0078125 | A1 * | 6/2002 | Ichinose et al. ............... 709/107 |
| 2004/0040025 | A1 * | 2/2004 | Lehtinen ...................... 718/104 |
| 2004/0199919 | A1 | 10/2004 | Tovinkere |
| 2005/0080981 | A1 * | 4/2005 | Archambault et al. .......... 711/1 |

FOREIGN PATENT DOCUMENTS

| JP | 2001-147819 A | 5/2001 |
| KR | 10-0634339 B1 | 10/2006 |

\* cited by examiner

*Primary Examiner* — Emerson Puente
*Assistant Examiner* — Willy W Huaracha
(74) *Attorney, Agent, or Firm* — Sughrue Mion, PLLC (57) ABSTRACT

A parallel processing apparatus and method are provided. The parallel processing apparatus includes: a control unit determining whether one or more threads can access one or more control blocks of a first container that exists in a direction in which at least one of the one or more threads perform a task; a container generating unit generating a second container that includes one or more control blocks on the basis of the result of the determination; and a container management unit connecting the one or more control blocks of the first container or the one or more control blocks of the first container and the one or more control blocks of the second container and control blocks in which the one or more threads perform tasks, in a ring shape.

20 Claims, 8 Drawing Sheets

```
struct container {                              310
    struct workshare_control_block {            320
        ...
    } WS_CB_ARRAY[WS_ARRAY_SIZE];               330
    struct container* next_container;           340
    unsigned int reusability_counter;           350
} container;
```

APPARATUS AND METHOD FOR PARALLEL PROCESSING

CROSS REFERENCE TO RELATED APPLICATION

This application claims priority from Korean Patent Application No. 10-2007-0052823 filed on May 30, 2007 in the Korean Intellectual Property Office, the disclosure of which is incorporated herein by reference in its entirety.

BACKGROUND OF THE INVENTION

1. Field of the Invention

The present invention relates to parallel processing, and more particularly, to parallel processing capable of improving reusability of a work sharing control block in dynamically generating the work sharing control block when a plurality of tasks are performed in parallel by a multi-thread.

2. Description of the Related Art

An Open Multi-Processing (MP) is an application program interface (API) for making a multi-thread parallel program in a shared memory environment, and is a set of compiler directives for representing shared memory parallelism.

Parallel programming using the OpenMP is realized by a compiler directive standard that inserts a directive into only a portion required for a sequential code. A user inserts an appropriate OpenMP directive into a portion required for parallelism, and then a compiler generates a multi-thread code on the basis of the inserted directive.

When a parallel section is specified in a program code by a compiler indicator, a master thread additionally generates a thread through an OpenMP runtime library call to enable parallel programming. A parallel section in which the generated threads perform tasks is divided into sub task sections, and each thread performs an allocated task, which makes it possible to perform work sharing in the parallel section.

Basically, the work sharing of the OpenMP has an implied barrier, which causes a thread that has completed tasks to wait until the other threads complete their tasks. When an instruction word "NOWAIT" is specified in the program, the implied barrier is removed, and each thread can immediately advance the next task without waiting.

Information required for work sharing may be specified in a control block in order for the threads to share the information. When the instruction word "NOWAIT" is specified in the program, a plurality of control blocks for managing a plurality of work sharing processes are needed.

For example, assuming that one parallel section has four NOWAIT work sharing regions, and four threads perform tasks in the regions, if, a first thread performs tasks in the first NOWAIT region and the other threads perform tasks in the second NOWAIT region, two control blocks are needed. In the same manner, when threads perform tasks in the corresponding work sharing regions according to a continuous series of NOWAIT instruction words, an additional control block is needed.

The number of control blocks that is required for each thread to perform work sharing until barrier synchronization occurs is determined by the number of divided tasks that have not been completed by all of the threads, which can be known only during a runtime.

That is, the number of control blocks can only be known during a runtime, which causes an unnecessary use of memory resources.

The following methods can be used to prevent the unnecessary use of memory resources due to the generation of control blocks: a method of statically arranging the control blocks to have the same size and managing the control blocks; a method of dynamically arranging the control blocks and managing the control blocks; and a method of statically arranging the control blocks to have the same size and dynamically adding the control blocks, if necessary. The first method may cause a memory over flow, and the second method has a problem in that all of the threads are synchronized to generate a new control block.

Therefore, a method of smoothly performing tasks in all work sharing regions while limiting the generation of the control blocks is needed.

SUMMARY OF THE INVENTION

The present invention provides a parallel processing apparatus and method capable of improving reusability of a work sharing control block in dynamically generating the work sharing control block when a plurality of tasks are performed in parallel by a multi-thread.

Aspects of the present invention are not limited to those mentioned above, and other aspects of the present invention will be apparently understood by those skilled in the art through the following description.

According to an aspect of the invention, a parallel processing apparatus includes: a control unit determining whether one or more threads can access one or more control blocks of a first container that exists in a direction in which at least one of the one or more threads perform a task; a container generating unit generating a second container that includes one or more control blocks on the basis of the result of the determination; and a container management unit connecting the one or more control blocks of the first container or the one or more control blocks of the first container and the one or more control blocks of the second container and control blocks in which the one or more threads perform tasks, in a ring shape.

According to another aspect of the invention, a parallel processing method includes: determining whether one or more threads can access one or more control blocks of a first container that exists in a direction in which at least one of the one or more threads perform a task; generating a second container that includes one or more control blocks on the basis of the result of the determination; and connecting the one or more control blocks of the first container or the one or more control blocks of the first container and the one or more control blocks of the second container and control blocks in which the one or more threads perform tasks, in a ring shape.

Details of other aspects of the invention are described in the following descriptions and accompanying drawings.

BRIEF DESCRIPTION OF THE DRAWINGS

The above and other aspects of the present invention will become more apparent by describing in detail preferred embodiments thereof with reference to the attached drawings, in which.

DESCRIPTION OF EXEMPLARY EMBODIMENTS

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which the exemplary embodiments of the invention are shown.

Figure 1:
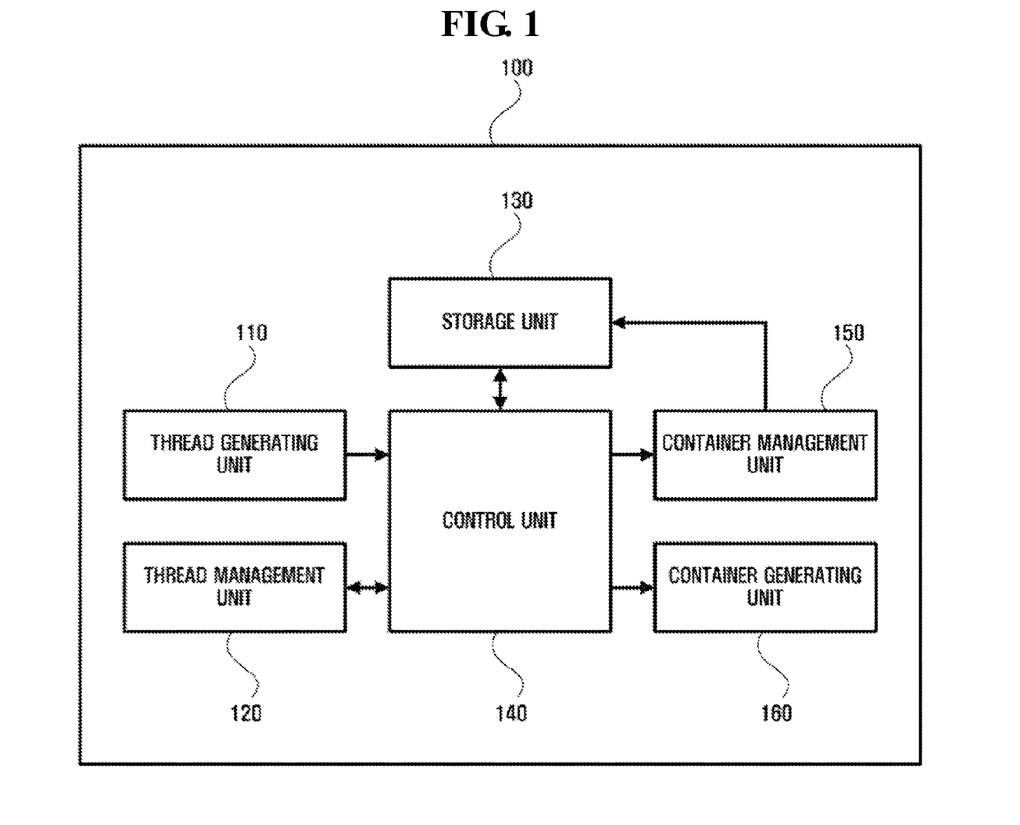
FIG. 1 is a block diagram illustrating a parallel processing apparatus according to an exemplary embodiment of the invention.

FIG. 1 is a block diagram illustrating a parallel processing apparatus according to an exemplary embodiment of the invention. A parallel processing apparatus 100 includes a thread generating unit 110, a thread management unit 120, a storage unit 130, a control unit 140, a container management unit 150, and a container generating unit 160.

In this exemplary embodiment of the invention, a container can be considered as a structure having one or more control blocks. In addition, in the container, parameters with respect to a connection relationship between containers and reusing of the control blocks are specified. The parameters of one container include a pointer of another container connected thereto and the number of threads used to perform tasks in all of the control blocks.

Here, another container connected to the one container means a container that is logically adjacent to the one container and exists in a direction in which a thread performs a task. That is, when another control block is needed as the thread performs a task, the thread accesses a control block that is logically adjacent thereto and performs the task. In this case, the container including the control block processed by the thread is referred to as another container connected to one container.

In addition, the number of threads used to perform tasks in all of the control blocks (hereinafter, referred to as a reuse count) means the number of threads that have performed tasks in all of the control blocks of one container and access control blocks of another container.

The reuse count is continuously updated by the threads that have completed tasks in one container and move to another container. If tasks are completely performed by all of the threads in one container in the current programming, the reuse count is initialized. When the reuse count is initialized, the control blocks of the one container may be performed by the threads that are performing tasks in another container. That is, the control blocks can be reused, which makes it possible to reduce the unnecessary use of memory resources.

The thread generating unit 110 generates threads. The threads may be classified into a master thread and slave threads according to a Fork-Join model of an OpenMP.

When the master thread performs a task in a serial performing section and then reaches a parallel processing section according to an indicator indicating parallel processing, the thread generating unit 110 generates a plurality of slave threads. The number of slave threads may be determined by a user. When the threads are generated according to an OpenMP standard, the thread generating unit 110 may use a compiler supporting the OpenMP.

A thread accesses a control block of a container and performs a process of reading or writing information required for work sharing. The thread management unit 120 controls an access of the thread to the control block. For example, a plurality of threads access one control block to perform tasks. In this case, the plurality of threads are allowed to perform a reading process, but are not allowed to perform a writing process. Therefore, the thread management unit 120 controls the threads not to perform the writing process.

In addition, when threads complete tasks in a specific control block, the thread management unit 120 controls the threads to advance to a next control block. When the threads perform tasks in the last control block of a container, the thread management unit 120 transmits to the control unit 140 a message indicating this status.

The control unit 140 determines whether threads can access control blocks included in a container that exists in a direction in which at least one thread is performing a task (hereinafter, referred to as a first container).

In order to perform the determining process, the control unit 140 compares a reuse count, which is one of the parameters of the first container, with the number of threads that are performing tasks in the current programming, and determines whether the threads can access the control blocks included in the first container. That is, when the reuse count is smaller than the number of threads that are performing tasks, the control unit 140 determines that the threads are not allowed to access the control blocks included in the first container. When the reuse count is equal to the number of threads that are performing tasks, the control unit 140 determines that the threads are allowed to access the control blocks included in the first container.

That a first container is accessible means that, since there are no threads that are performing tasks in the control blocks of the first container, the first container can be reused.

That a first container is inaccessible means that, since there exist threads that are performing tasks in the control blocks of the first container, a new container is needed. Consequently, the control unit 140 controls the container generating unit 160 to generate a new container.

Further, the control unit 140 generally controls the thread generating unit 110, the thread management unit 120, the storage unit 130, the container management unit 150, the container generating unit 160, and the parallel processing apparatus 100.

The container generating unit 160 generates a container including one or more control blocks according to a result determined by the control unit 140. That is, when the control unit 140 determines that the reuse count of a container that exists in a direction in which threads perform tasks is smaller than the number of threads that are performing the tasks, the container generating unit 160 generates a new container.

The control unit 140 may determine whether a new container needs to be generated on the basis of the reuse count of each container and the progress of the tasks performed by threads. For example, when four threads access three control blocks and perform tasks in the current programming, one control block is additionally needed. In this case, when the three control blocks are included in one container, it is expected that a container will be necessarily generated. Therefore, the control unit 140 determines whether to generate a new container, and controls the container generating unit 160 to generate a new container according to the result of the determination. Hereinafter, a container that is newly generated by the container generating unit 160 is referred to as a second container.

The container management unit 150 serves to connect control blocks included in the first container or control blocks included in the first and second control blocks to control blocks in which the threads are performing tasks in a ring shape. That is, the container management unit 150 sets pointers of adjacent containers, which are parameters included in each container, to connect a plurality of containers in a ring shape.

When one container is generated, the container management unit 150 sets a pointer of the generated container. As a result, it is possible to continuously reuse one container.

The storage unit 130 stores a container structure that is dynamically generated. The container management unit 150 can access the storage unit 130 to manage the current container. The storage unit 130 is a module capable of inputting/outputting information, such as a hard disk, a flash memory, a compact flash card (CF card), a secure digital card (SD card), a smart media card (SM card), a multimedia card (MMC), or a memory stick, and it may be provided in the parallel processing apparatus 100 or in a separate apparatus. When the storage unit 130 is provided in a separate apparatus, the parallel processing apparatus 100 may be provided with a communication unit (not shown) that can communicate with the separate apparatus.

Figure 2:
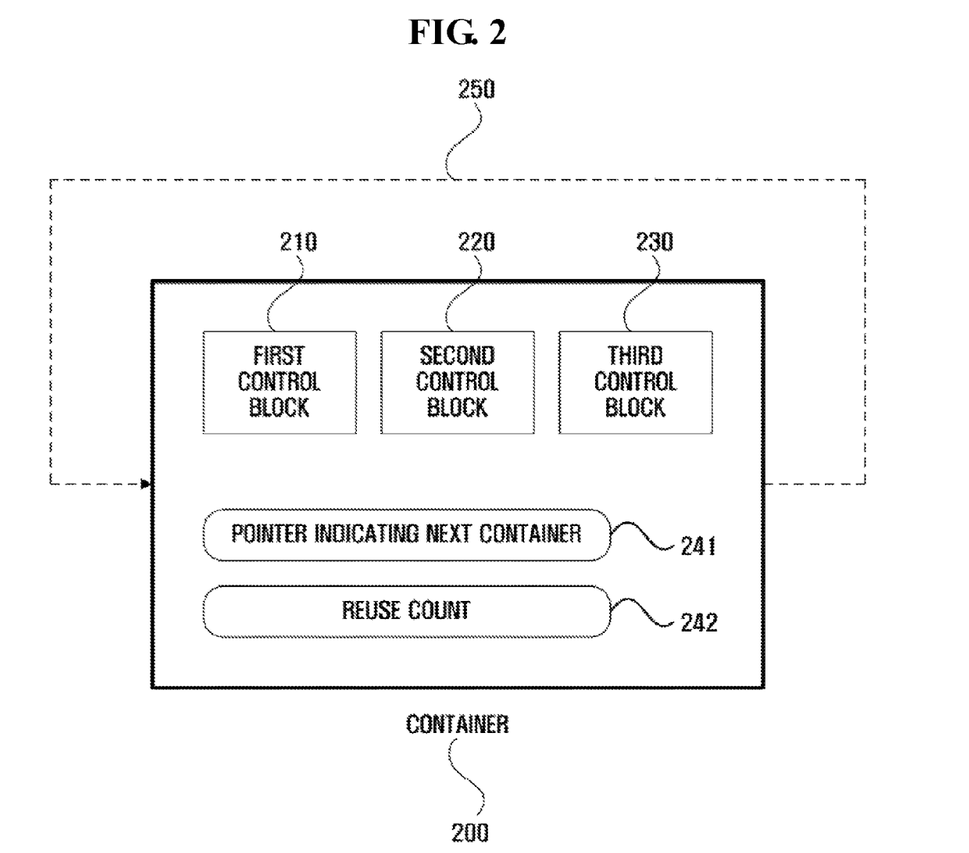
FIG. 2 is a diagram illustrating a container according to an exemplary embodiment of the invention.

FIG. 2 is a diagram illustrating a container according to an exemplary embodiment of the invention. The container 200 includes a series of control blocks 210, 220, and 230, and further includes a pointer 241 indicating a next container and a reuse count 242 as parameters.

A thread accesses the control blocks 210, 220, and 230 to perform a task required for work sharing. In this case, the thread sequentially accesses the control blocks 210, 220, and 230 of the container 200 under a control of the thread management unit 120. For example, the thread can access the first control block 210, the second control block 220, and the third control block 230 in this order.

The thread may access control blocks of the next container connected to the current container to perform tasks according to a result determined by the control unit 140. In this case, the thread can access the control block specified by the pointer 241 indicating a next container. In FIG. 2, a loop 250 illustrating a connection relationship between the current container and the next container is a feedback loop. This means that only one container exists, that is, the current container is initially generated.

Figure 3:
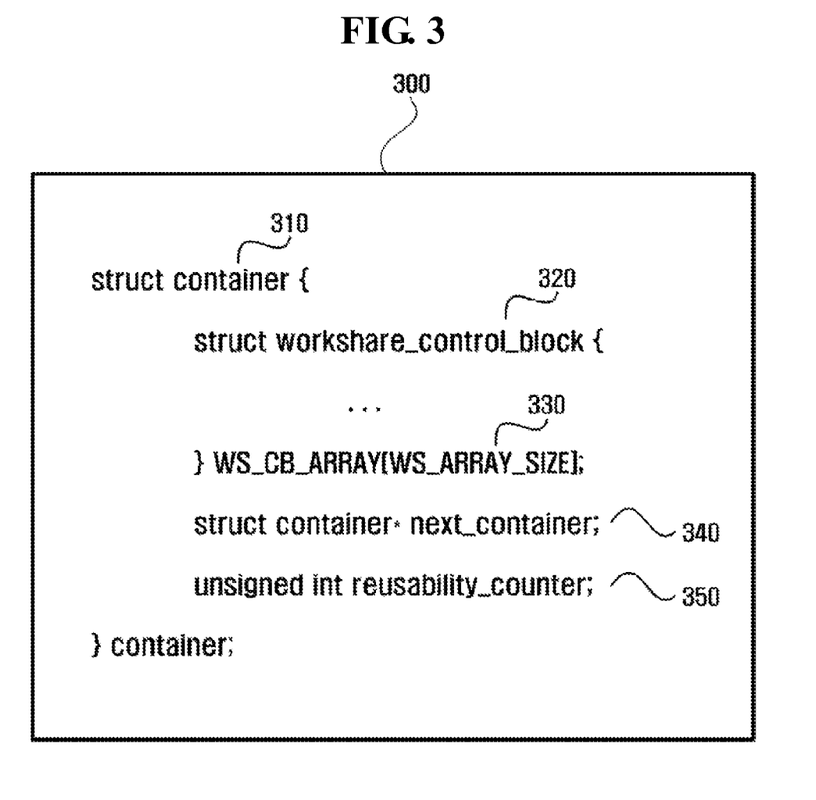
FIG. 3 is a diagram illustrating a programming code of a container according to an exemplary embodiment of the invention.

FIG. 3 shows a container structure as a programming code 300 of a container according to an exemplary embodiment of the invention.

A matrix 320 of structure-type control blocks is specified in a container 310, and the number of control blocks 330 included in the container 310 is also specified therein. Further, a pointer 340 indicating a next container and a reuse parameter 350 are specified in the container 310 as parameters.

The container generating unit 160 dynamically generates the container structure 300, and the pointer 340 indicating a next container and the reuse count 350 are updated by the container management unit 150.

Figure 4:
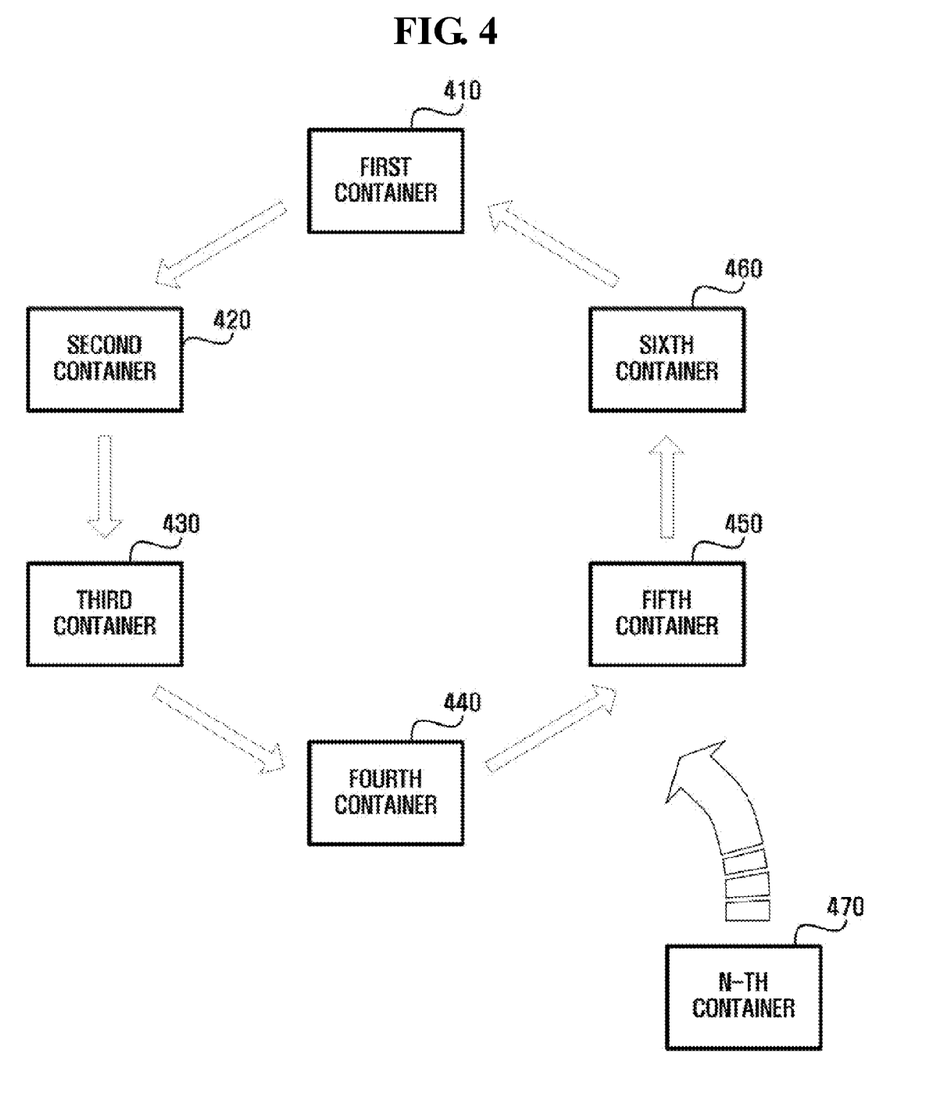
FIG. 4 is a diagram illustrating a plurality of containers connected to one another in a ring shape according to an exemplary embodiment of the invention.

FIG. 4 is a diagram illustrating a plurality of containers connected in a ring shape according to an exemplary embodiment of the invention. As shown in FIG. 4, a plurality of containers 410, 420, 430, 440, 450, and 460 are connected to one another in a ring shape.

The container management unit 150 sets a pointer indicating a next container, which is a parameter of each container, to form a ring-shaped container group shown in FIG. 4.

For example, the container management unit 150 sets a next container of the first container 410 as the second container 420 and a next container of the second container 420 as the third container 430. Finally, the container management unit 150 sets a next container of the sixth container 460 as the first container 410.

When the control unit 140 determines that a new container needs to be generated, the container generating unit 160 generates an N-th container 470, which is a new container, and the generated container is included in the ring-shaped container group. That is, the container management unit 150 sets a next container of one of the existing containers 410, 420, 430, 440, 450, and 460 as the N-th container 470, and sets the next container of the N-th container 470 as another one of the existing containers.

For example, when the N-th container 470 is inserted between the fourth container 440 and the fifth container 450, the container management unit 150 sets a next container of the fourth container 440 as the N-th container 470 and a next container of the N-th container 470 as the fifth container 450.

An insertion position of the N-th container may be arbitrarily determined. For example, when a thread that is performing a task in a control block of the fourth container 440 wants to move to a control block of another container and other threads are performing tasks in control blocks of the other containers 410, 420, 430, 450, and 460, the N-th container 470, which is a new container, needs to be generated. In this case, the N-th container 470 that is newly generated may be inserted between the fourth container 440 and the fifth container 450, or it may be inserted between different containers. That is, the N-th container 470 may be inserted between the fifth container 450 and the sixth container 460 or between the first container 410 and the second container 420.

Even if the N-th container 470 is not inserted between the fourth container 440 and the fifth container 450, the thread management unit 120 allows the thread that is performing the task in the fourth container 440 to access a control block of the N-th container 470. Therefore, the N-th container 470 may be inserted regardless of the thread that wants to move to another container.

Figure 5:
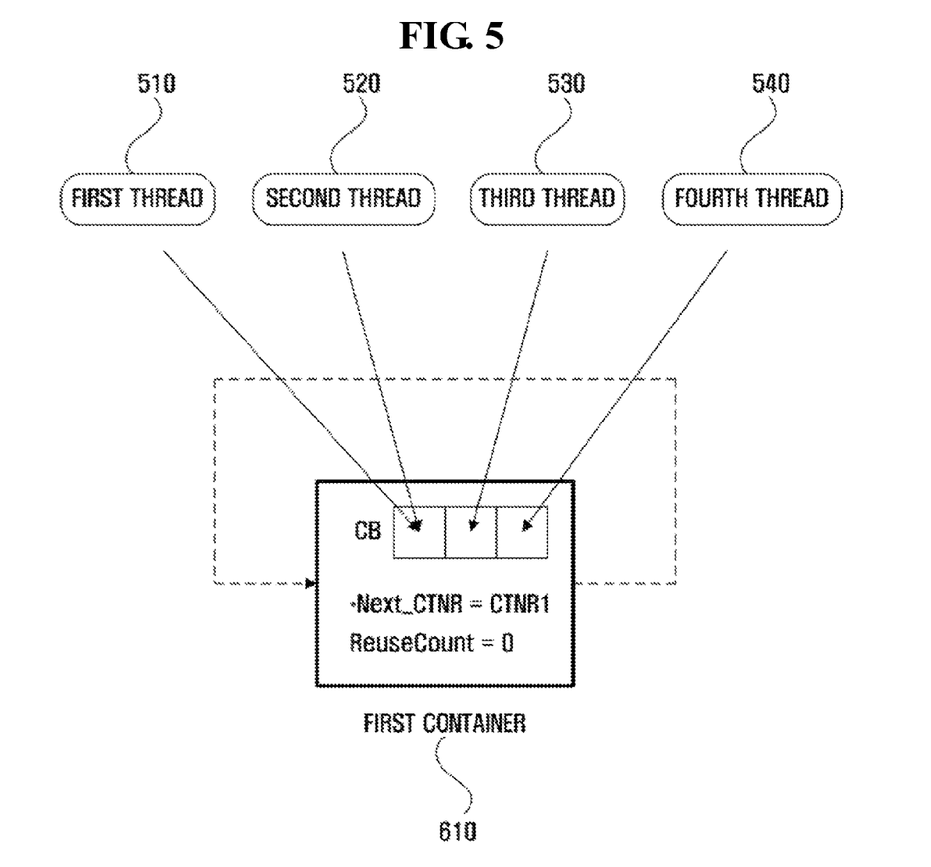
FIG. 5 is a diagram illustrating a plurality of threads that access a plurality of control blocks of a container according to an exemplary embodiment of the invention.

FIG. 5 shows a plurality of threads accessing a plurality of control blocks of a container according to an exemplary embodiment of the invention. As shown in FIG. 5, four threads 510, 520, 530, and 540 access three control blocks of a first container 610.

As shown in FIG. 5, the threads 510, 520, 530, and 540 can access one control block. That is, two or more threads can access one control block. For example, the third thread 530 and the fourth thread 540 access corresponding control blocks, and the first thread 510 and the second thread 520 access one control block. In this case, the first and second threads 510 and 520 can perform a reading operation at the same time, but only one thread can perform a writing operation under a control of the thread management unit 120.

Each thread accesses all of the control blocks to perform tasks. A thread that has completed tasks in the last control block moves to a control block of another container and continues to perform tasks.

As shown in FIG. 5, a pointer indicating a next container indicates the current container (i.e., the first container 610), and thus a feedback loop is formed to show connection relationship between the current container and the next container. This means that only one container exists, that is, the current container is initially generated. In addition, in FIG. 5, the reuse count is represented by 0, which means that there is no thread that has completed tasks in all of the control blocks of the first container 610.

When one of the first to fourth threads 510, 520, 530, and 540 completes tasks and wants to move to another control block, a new container needs to be generated since the other threads are performing tasks in the control blocks included in the first container 610.

Figure 6:
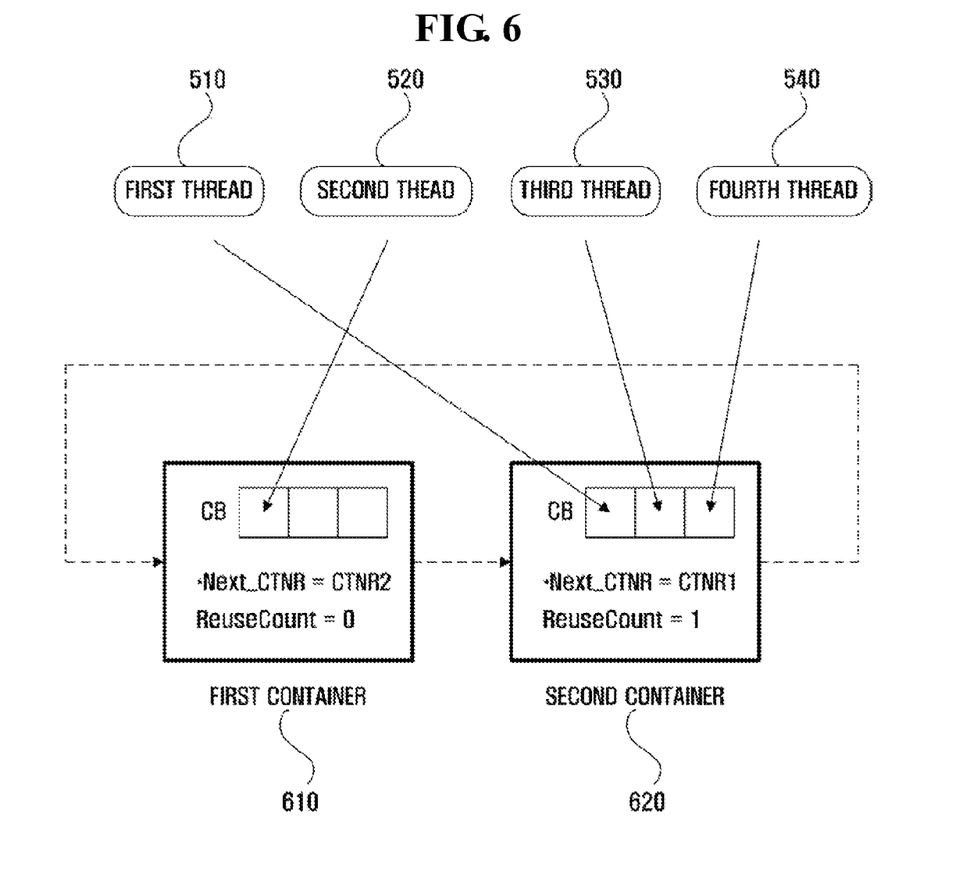
FIG. 6 is a diagram illustrating the reusing of a control block according to an exemplary embodiment of the invention.

FIG. 6 shows reusing of control blocks according to an exemplary embodiment of the invention. As shown in FIG. 6, two containers 610 and 620 are connected in a ring shape, and four threads 510, 520, 530, and 540 access control blocks of the two containers 610 and 620 to perform tasks.

First, the first to fourth threads 510 to 540 complete tasks in the control blocks of the first container 610, and then move to the second container 620 that is newly generated to perform tasks. Since the first to fourth threads 510 to 540 move from the first container 610 to the second container 620, the reuse count of the first container 610 becomes 4.

When the second thread 520 completes all of the tasks in the second container 620, the control unit 140 checks the reuse count of a container connected to the second container 620, that is, the first container 610. As a result, since the reuse count of the first container 610 is 4 and the number of threads 510, 520, 530, and 540 that are operating in the program is 4, the container management unit 150 initializes the reuse count of the first container 610 to zero.

Then, the second thread 520 can access a control block of the first container 610 to perform tasks, which is shown in FIG. 6. As shown in FIG. 6, when the parameter of the first container 610 is initialized by the container management unit 150, the reuse count becomes zero. When the second thread 520 completes tasks in the second container 620 and moves to the first container 610, the reuse count of the second container 620 becomes 1.

Figure 7:
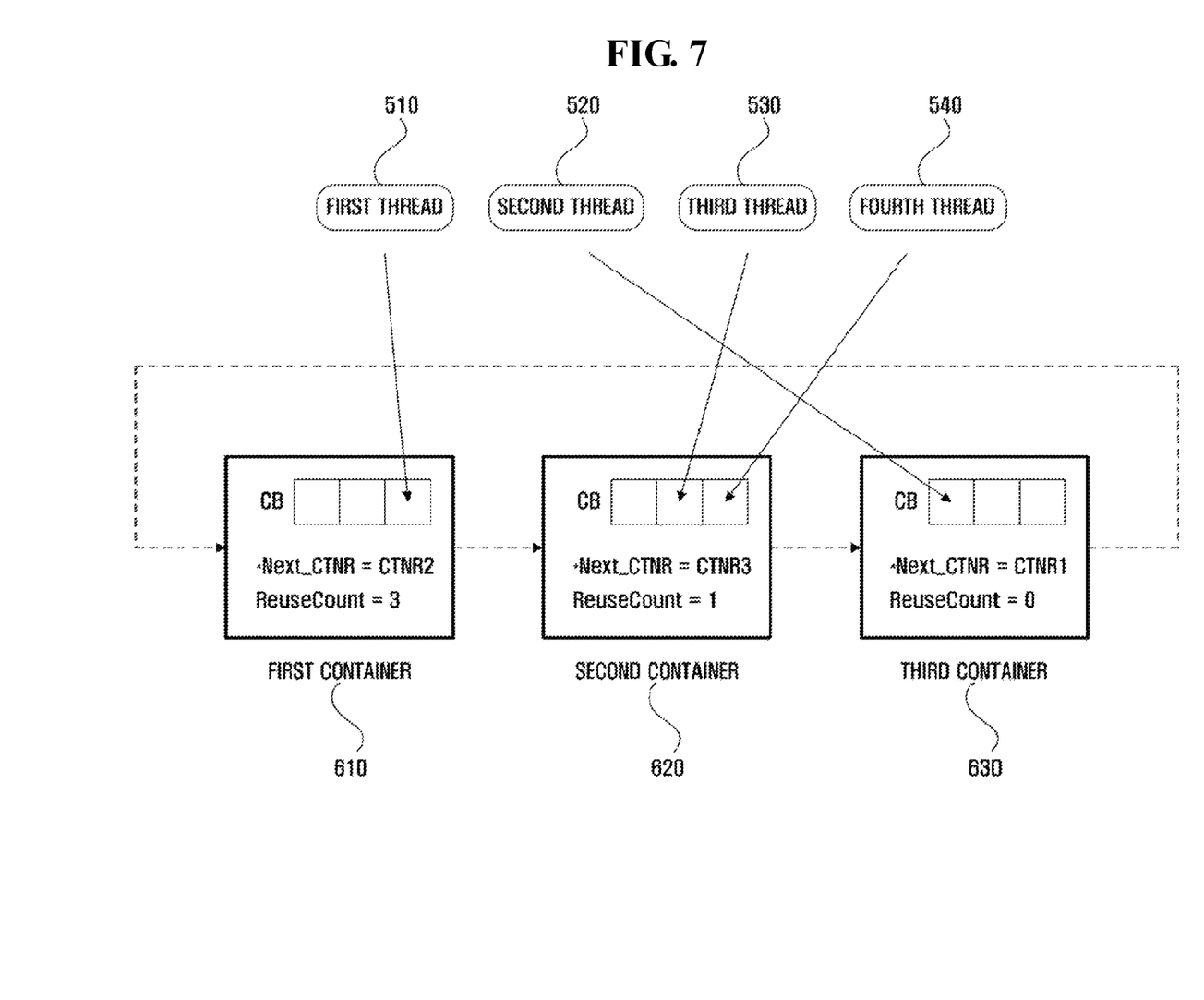
FIG. 7 is a diagram illustrating the generation of a container according to an exemplary embodiment of the invention.

FIG. 7 is a diagram illustrating generation of a container according to an exemplary embodiment of the invention. As shown in FIG. 7, as first to fourth threads 510 to 540 progress tasks, a third container 630 is newly generated in addition to first and second containers 610 and 620, and is included in a ring-shaped container group.

First, the first to fourth threads 510 to 540 access control blocks of the first container 510 to perform tasks. Then, the second to fourth threads 520 to 540 move to control blocks of the second container 620, and the reuse count of the first container 610 is updated to 3.

When the second to fourth threads 520 to 540 complete tasks in the control blocks of the second container 620, the second thread 520 moves to a control block of another container. At that time, since the first thread 150 is performing tasks in the control block of the first container, the control unit 140 controls the container generating unit 160 to generate a new container.

When the third container 630, which is a new container, is generated in this way, the third container 630 is included in the ring-shaped container group, and the second thread 520 moves to a control block of the third container 630 to perform tasks. When the second thread 520 moves to the third container 630, the reuse count of the second container 620 is updated to 1.

Figure 8:
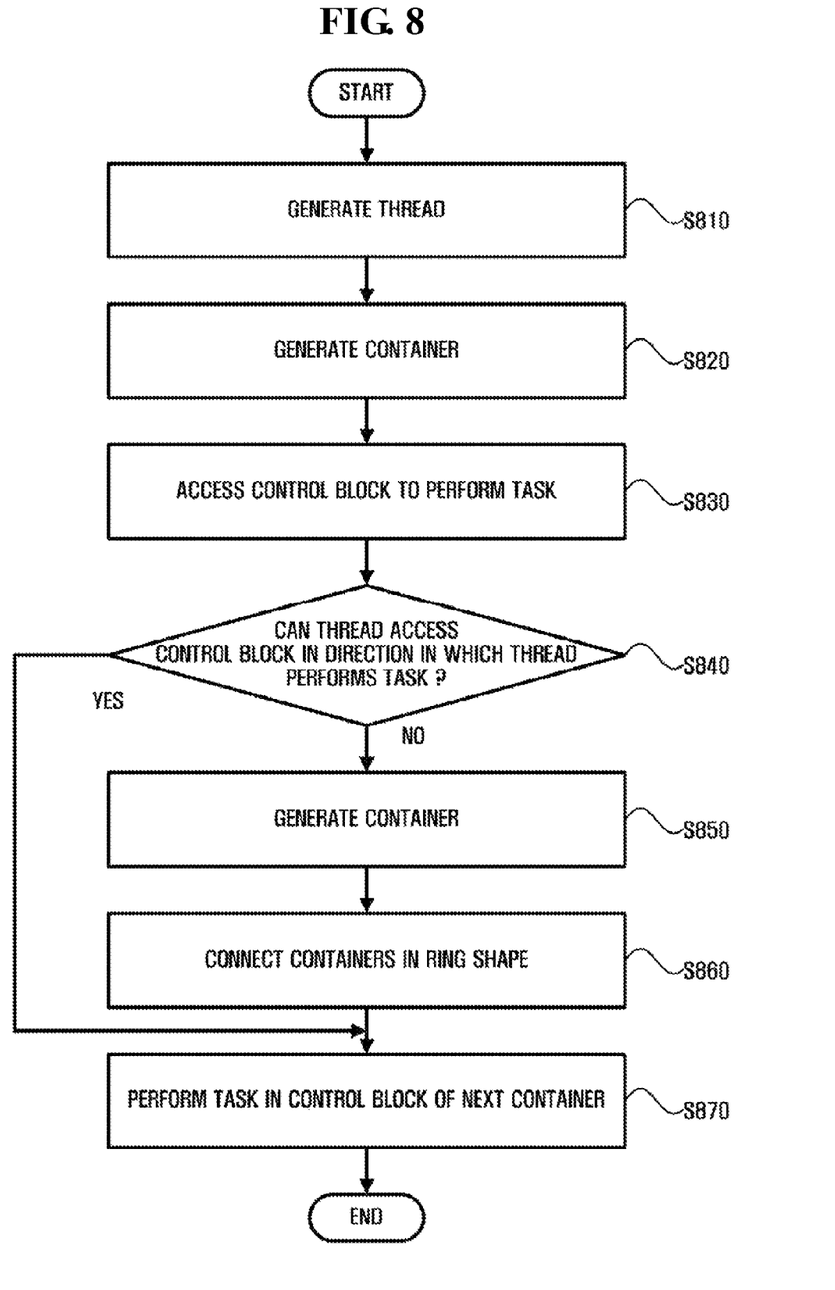
FIG. 8 is a flowchart illustrating a parallel processing method according to an exemplary embodiment of the invention.

FIG. 8 is a flowchart illustrating parallel processing according to an exemplary embodiment of the invention. In order to perform parallel processing, first, the thread generating unit 100 generates threads (S810). The threads generated by the thread generating unit 110 include a master thread and slave threads. When the master thread reaches a parallel processing section while performing tasks, the thread generating unit 110 generates slave threads whose number corresponds to the parallel processing section.

When the threads are generated, the container generating unit 160 generates a container having one or more control blocks (S820). The generated container is an initial container, and has a pointer indicating a next container as a parameter. In this case, the pointer is set to indicate the generated container as the next container.

When the container is generated, the thread accesses the control block of the generated container to perform a reading or writing process (S830). When the thread completes tasks in one control block, the thread moves to a next control block. In this exemplary embodiment, it is assumed that an instruction code NOWAIT is specified in a program as a programming code. Therefore, an implied barrier is removed, and the thread can immediately perform tasks without waiting.

When a plurality of containers are generated and the threads that have completed tasks in all of the control blocks of one of the plurality of containers are generated, the control unit 140 checks whether the threads are allowed to access control blocks in a direction in which the threads perform tasks (S840). At that time, the control unit 140 can compare the reuse count of a container that exists in the direction in which the threads perform tasks with the number of threads that are performing tasks in the program, that is, the number of slave threads, and checks whether the threads are allowed to access the control blocks on the basis of a result of the comparison.

As the result of the comparison, when the number of threads that are performing tasks is larger than the reuse count, the control unit 140 determines that the threads cannot access the control blocks in the direction in which the threads perform task, and controls the container generating unit 160 to generate a new container.

Then, the container generating unit 160 generates a new container according to a control command from the control unit 140 (S850). The container management unit 150 includes the generated container in a ring-shaped container group. In this case, the insertion position of the generated container may be arbitrarily determined.

Subsequently, the container management unit 150 sets the parameters of the existing containers and a parameter of the newly generated container such that all of the containers are formed in a ring shape (S860).

When the newly generated container is inserted into the ring-shaped container group, the thread that wants to move to another container can access a control block of the inserted container to perform tasks (S870).

Meanwhile, the control unit 140 may determine whether a new container needs to be generated on the basis of the reuse count of each container, which is a parameter, and the progress of the tasks performed by the threads, using a separate thread. When determining that a new container needs to be generated, the control unit 140 controls the container generating unit 160 to generate a new container even though a thread that wants to move to another container is not generated, and controls the container management unit 150 to insert the generated container into the container group. In this way, it is possible to disperse overhead caused by the generation of the container.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

As described above, the parallel processing apparatus according to the above-described exemplary embodiments of the invention has the following effects.

First, when a plurality of tasks are processed in parallel, it is possible to improve reusability of a work sharing control block in dynamically generating the work sharing control block, and thus reduce an unnecessary use of memory resources.

Second, thread synchronization is not performed, which makes it possible to prevent a time delay.

What is claimed is:

1. A parallel processing apparatus comprising:
   a memory;
   a control unit that determines whether one or more threads can access one or more control blocks of a first container that exists in a direction in which at least one of the one or more threads perform a task;
   a container generating unit that generates a second container that comprises one or more control blocks based on a result of the determination; and
   a container management unit that connects the one or more control blocks of the first container or the one or more control blocks of the first container and the one or more control block of the second container and control blocks in which the one or more threads perform tasks, in a ring shape,
   wherein each of the first and the second containers has a pointer that indicates a next container connected to the each of the first and the second containers, and a reuse count, the reuse count being a number of threads that have completed tasks in all of the one or more control blocks of the each of the first and the second containers, and
   wherein the pointer and the reuse count are parameters.

2. The parallel processing apparatus of claim 1, wherein the container management unit sets the pointer to connect the one or more control blocks of the first container and the one or more control blocks of the second container in the ring shape.

3. The parallel processing apparatus of claim 2, wherein a newly generated container is arbitrarily inserted into a position in the ring shape of preexisting containers.

4. The parallel processing apparatus of claim 1, wherein the control unit compares the number of threads that have completed the tasks in all of the one or more control blocks of the first container, which is a parameter of the first container, with a number of threads that are performing the tasks in the one or more control blocks of the first container, and determines whether the one or more threads can access the one or more control blocks of the first container based on a result of the comparison.

5. The parallel processing apparatus of claim 4, wherein, if the number of threads that have completed the tasks in all of the one or more control blocks of the first container, which is a parameter of the first container, is smaller than the number of threads that are performing the tasks in the one or more control blocks of the first container, the control unit determines that the one or more threads cannot access the one or more control blocks of the first container.

6. The parallel processing apparatus of claim 1, wherein the control unit determines whether the second container needs to be generated based on the number of threads that have completed the tasks in all of the one or more control blocks of the first container, which is a parameter of the first container, and progress of the tasks performed by the one or more threads.

7. The parallel processing apparatus of claim 6, wherein the control unit checks the number of threads that have completed the tasks in all of the one or more control blocks of the first container, which is a parameter of the first container, and the progress of the tasks performed by the one or more threads, using a separate thread.

8. The parallel processing apparatus of claim 1, wherein, if it is determined that the one or more threads cannot access the one or more control blocks of the first container, the container management unit generates the second container.

9. The parallel processing apparatus of claim 1, wherein the one or more threads comprises a master thread and a plurality of slave threads branched from the master thread.

10. The parallel processing apparatus of claim 9, further comprising a thread generating unit that generates the master thread and the slave threads.

11. A parallel processing method comprising:
    determining whether one or more threads can access one or more control blocks of a first container that exists in a direction in which at least one of the one or more threads perform a task;
    generating a second container that includes one or more control blocks based on a result of the determining; and
    connecting the one or more control blocks of the first container or the one or more control blocks of the first container and the one or more control blocks of the second container and control blocks in which the one or more threads perform tasks, in a ring shape,
    wherein each of the first and the second containers has a pointer that indicates a next container connected to the each of the first and the second containers, and a reuse count, the reuse count being a number of threads that have completed tasks in all of the one or more control blocks of the each of the first and the second containers, and
    wherein the pointer and the reuse count are parameters.

12. The parallel processing method of claim 11, wherein the connecting in the ring shape comprises setting the pointer to connect the one or more control blocks of the first container and the one or more control blocks of the second container in the ring shape.

13. The parallel processing method of claim 12, wherein a newly generated container is arbitrarily inserted into a position in the ring shape of preexisting containers.

14. The parallel processing method of claim 11, wherein the determining comprises comparing the number of threads that have completed the tasks in all of the one or more control blocks of the first container, which is a parameter of the first container, with a number of threads that are performing the tasks in the one or more control block of the first container to determine whether the one or more threads can access the one or more control blocks of the first container.

15. The parallel processing method of claim 14, wherein the determining comprises if the number of threads that have completed the tasks in all of the one or more control blocks of the first container, which is a parameter of the first container, is smaller than the number of threads that are performing the tasks in the one or more control blocks of the first container, determining that the one or more threads cannot access the one or more control blocks of the first container.

16. The parallel processing method of claim 11, further comprising determining whether the second container needs to be generated based on the number of threads that have completed the tasks in all of the one or more control blocks of the first container, which is a parameter of the first container, and progress of the tasks performed by the one or more threads.

17. The parallel processing method of claim 16, wherein the determining whether the second container needs to be generated comprises checking the number of threads that have completed the tasks in all of the one or more control blocks of the first container, which is a parameter of the first container, and the progress of the tasks performed by the one or more threads, using a separate thread.

18. The parallel processing method of claim 11, wherein the generating the second container comprises if it is determined that the one or more threads cannot access the one or more control blocks of the first container, generating the second container.

19. The parallel processing method of claim 11, wherein the one or more threads comprise a master thread and a plurality of slave threads branched from the master slave.

20. The parallel processing method of claim 19, further comprising generating the master thread and the slave threads.

* * * * *